under 35 U.S.C. 154(b) by 192 days.

(12) United States Patent
Blondeel et al.

(10) Patent No.: US 8,833,583 B2
(45) Date of Patent: Sep. 16, 2014

(54) ASSEMBLY OF A FOOD TRAY AND A FOOD CONTAINER, AND USE THEREOF IN AN AIRCRAFT

(75) Inventors: Etienne Herman Walter Blondeel, Terheijden (NL); Cecil Marie Lommen, Terheijden (NL)

(73) Assignee: Eureka Concepts International B.V. (NL)

( * ) Notice: Subject to any disclaimer, the term of this patent is extended or adjusted under 35 U.S.C. 154(b) by 192 days.

(21) Appl. No.: 13/059,948

(22) PCT Filed: Aug. 18, 2009

(86) PCT No.: PCT/NL2009/050500
§ 371 (c)(1),
(2), (4) Date: Apr. 6, 2011

(87) PCT Pub. No.: WO2010/021544
PCT Pub. Date: Feb. 25, 2010

(65) Prior Publication Data
US 2011/0174677 A1 Jul. 21, 2011

(30) Foreign Application Priority Data

Aug. 18, 2008 (EP) .................................... 08162547
Mar. 17, 2009 (EP) .................................... 09155353
May 20, 2009 (EP) .................................... 09160792

(51) Int. Cl.
*B65D 1/34* (2006.01)
*A47B 85/00* (2006.01)
*A47G 19/00* (2006.01)
*A47G 21/00* (2006.01)
*A47G 19/06* (2006.01)
*A47G 23/06* (2006.01)
*B64D 11/06* (2006.01)

(52) U.S. Cl.
CPC ........ *A47G 23/06* (2013.01); *A47G 2023/0675* (2013.01); *A47G 21/00* (2013.01); *B64D 2011/0679* (2013.01); *A47G 19/06* (2013.01)
USPC ........................... 220/23.83; 108/25; 206/557

(58) Field of Classification Search
USPC .............. 220/574, 23.4, 23.83, 23.87, 23.88, 220/23.89, 719, 697; 297/188.01, 188.06, 297/188.04; 108/25, 44; 206/557–560, 206/562–565; 264/319; 446/71, 73; 248/37.3, 356.03, 346.04, 346.11, 248/346.06
See application file for complete search history.

(56) References Cited

U.S. PATENT DOCUMENTS 4,122,780 A * 10/1978 Brickman ........................ 108/25
4,662,676 A * 5/1987 Havelock ....................... 297/160

(Continued)

FOREIGN PATENT DOCUMENTS

DE 92 02 242 6/1993
DE 102008024596 A1 * 5/2009

(Continued)

*Primary Examiner* — Bryon Gehman
*Assistant Examiner* — Shawn M Braden
(74) *Attorney, Agent, or Firm* — Meyer IP Law Group

(57) ABSTRACT

The invention provides an assembly of a food tray (183) and a food container such as a cup or a plate. The tray (183) can comprise a generally flat surface for supporting the food containers. The food tray (183) and the food container comprise an interlocking system for positioning the food containers on the food tray. The interlocking system comprises male and corresponding female parts provided on the food tray and food container. The generally flat surface comprises a field of multiple (female or male) parts of the interlocking system forming a surface for positioning and releasably locking at multiple positions bottom side of the food container. The invention provides for the use of the interlocking system in travel catering, such as in vehicles and airplanes.

17 Claims, 11 Drawing Sheets

(56) References Cited

U.S. PATENT DOCUMENTS

| | | | |
|---|---|---|---|
| 4,872,410 A * | 10/1989 | Lilly | 108/26 |
| 4,930,637 A | 6/1990 | DeRoseau | |
| 5,615,619 A * | 4/1997 | King | 108/25 |
| 5,878,672 A * | 3/1999 | Ostermann et al. | 108/44 |
| 5,975,628 A * | 11/1999 | Russell | 297/135 |
| 6,149,011 A | 11/2000 | Csengeri et al. | |
| 7,699,949 B2 * | 4/2010 | Newton et al. | 156/60 |
| 2007/0113757 A1 * | 5/2007 | Lilly | 108/25 |

FOREIGN PATENT DOCUMENTS

| | | |
|---|---|---|
| EP | 0 443 951 | 8/1991 |
| NL | 7 000 800 | 7/1970 |

\* cited by examiner

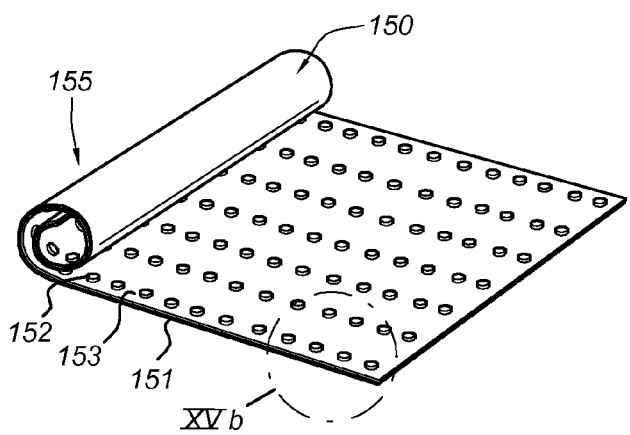
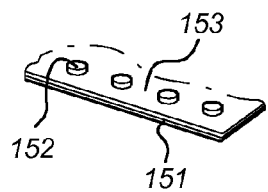
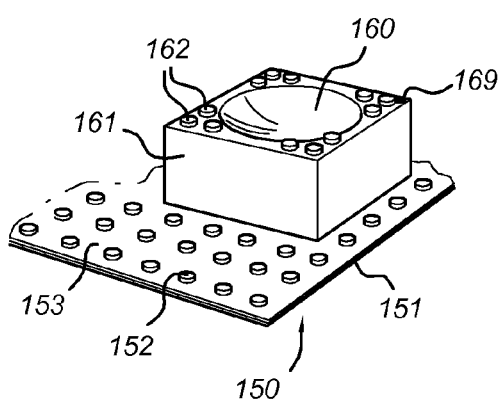
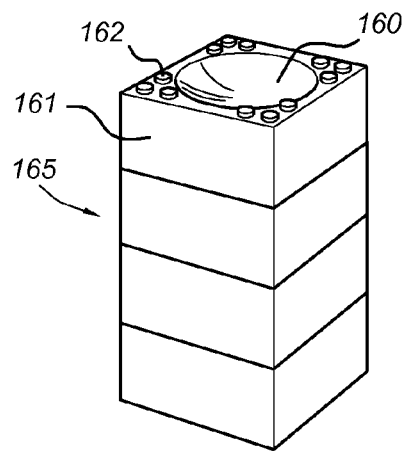
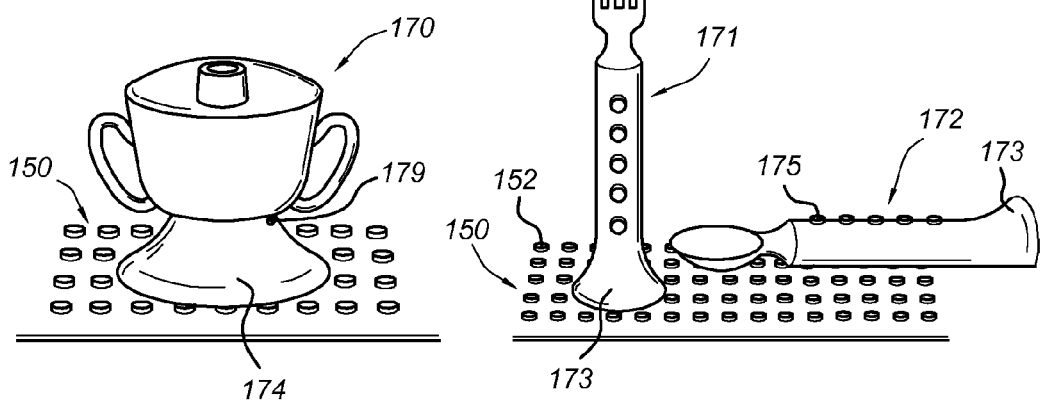

ASSEMBLY OF A FOOD TRAY AND A FOOD CONTAINER, AND USE THEREOF IN AN AIRCRAFT

The invention relates to an assembly of a food tray and a food container such as a cup or a plate. In particular the invention relates to the use of an improved interlocking system for the food tray and food container. The invention also relates to such an assembly further comprising a transport trolley for supporting multiple food trays. The invention further relates to use of a food tray and food container in a mobile or travel catering, such as in a an airplane.

Such assemblies can be used in an aircraft for distributing food held in the food container supported by the food tray amongst passengers. A flight attendant can grab the food tray supporting the food containers and hand the tray with the food to a passenger.

It is known that an assembly of a food tray and a food container filled with food such as drinks, can cause stains on clothing. The cause can be uncareful handling by the passenger or due to an external cause such turbulence.

It is known to provide food trays having a surface for supporting the food container with a coating of high friction or anti-slip material in order to provide extra friction between the food tray and the food container to prevent slipping and subsequent falling over of the food container. The high friction/anti slipping material can provide only a limited protection. Especially cups, which have a higher centre of gravity, can fall over and the contained drink can be spilt. A food container according to this application comprises beverage cups, solid food dishes or plates, holders etc.

From DE 3101758 an assembly of food containers and supporting surface is known for transporting the food containers. The cup is held in position using a separate pin that is put in an insertion in the surface of a support in order to prevent falling over of the food container during transport. As such, it does not address the problem of food containers falling over during meal consumption. A further disadvantage lies in the fact that DE3101758 does not allow food containers to be placed at multiple positions. They must be placed on their respective pins.

From EP0443951A an anti-slip system comprising tray and food containers, providing recessions in the tray and protrusions in bottom of the food containers, is known. When the food container is placed on the tray, with the food container protusions inside the tray recessions, the sideways movement of the food container is limited. However, the system provides only antislip measures, the container is not prevented from falling over.

Therefore it is still a problem to provide an assembly of a food tray and food container that provides a safe and secure, reusable system that protects a user from food falling from a container causing stains, under the condition that the assembly still provides the user with the opportunity to place the food containers at multiple positions. It is a goal of the invention to provide for such a system.

According to an aspect of the invention an assembly of a food tray and a food container such as a cup or a plate is provided wherein the tray comprises at least one generally flat surface for supporting the food containers. The food tray and food container comprise in a preferred embodiment an interlocking system for positioning the food containers on the tray. The interlocking system comprises male and corresponding female parts provided on the tray and food containers. The interlocking system is preferably constructed and arranged to position and releasably lock corresponding parts. The male parts are constructed and arranged to lock onto the female parts. According to the invention the generally flat surface comprises a field of multiple (male or female) parts of the interlocking system forming a surface for positioning and releasably locking at multiple position bottom side of the food container. The bottom side of the food container is according to the invention provided with a structure that allows the releasable locking onto of the food containers. By providing a field of multiple parts, the user is able to lock, unlock and reposition the food container on the surface of the food tray. Such repositioning is particularly preferred by a passenger using a cup for drinks. The interlocking system is arranged to prevent locked elements from falling over. An interlocking system according to the invention allows tilting of the tray without causing the containers to fall over.

U.S. Pat. No. 6,149,011 discloses an apparatus, like a dining plate or tray, having multiple level eating surfaces for serving food to an individual. The embodiments of U.S. Pat. No. 6,149,011 have a base structure (tray), several pillars which can optionally differ in height, and several elevated eating surfaces each supported by at least one of the pillars. Said pillars, in an embodiment of U.S. Pat. No. 6,149,011 are connected to the base structure using male and female connecting parts. However, the pillars supporting the eating surfaces are always placed a fixed position on the tray, and therefore do not allow a person using the tray to place the food containers at an arbitrary position on the tray. It is an object of the present invention to improve a system that lets the user securely place food containers at an arbitrary position on the tray. According to the invention this is achieved with a field of multiple interconnecting elements, said field comprising more interconnecting elements than interconnecting elements on the food container. The system according to U.S. Pat. No. 6,149,011 is therefore not the closest prior art.

In any of the embodiments the food tray can be replaced by a mat, such as a placemat. In an airplane, a placemat can be distributed to be put on a table, in order to support a food or drink container.

Preferably the food containers and in a further preferred embodiment the food trays, are formed by injection moulding. This allows forming the food containers as disposables or rotables. In an embodiment the disposables can be used a few times. In an embodiment in particular the food tray is formed using compression molding, thermoforming or blow molding. In particular compression molding or thermoforming is advantageous for forming a field of male parts comprising projections extending from a surface.

In a preferred embodiment the food containers and in a further preferred embodiment the food tray, is integrally formed provided with the parts of the interlocking system. This allows the manufacture of the food containers and/or the food tray in one manufacturing step.

It is advantageous to integrally form the interlocking system on the bottom side of the food container during the manufacture of the food container by injection molding. In a single step of manufacture the disposable food container with the interlocking system is formed.

It is preferred to provide an assembly of at least two food containers such as a cup and a plate. The two food containers can be arranged in a suitable manner by a food distributor for providing the trays with the food containers locked thereon containing the food.

In an embodiment the food container comprises a bottom part or foot provided with parts of the interlocking system and an actual food container with a edge provided near the upper part. The bottom part can be open or hollow and will form a possible reservoir for dishwasher water. According to the invention a hole or channel is provided, functioning as a drain, connecting the hollow bottom part with outside for allowing outflow of water or other liquid received in the hollow bottom part. Preferably multiple holes are provided. Preferably the hole is positioned at the end of the foot connected to the actual food container. This will be most beneficial for the drain functionality.

Preferably the field of multiple (female or male) parts of the interconnecting system allows multiple arrangements of food containers on that surface. This will allow to use the same food tray for different meal setups using different sets or arrangements of flat ware.

Preferably the interconnecting system according to the invention comprises a field of at least five (male or female) parts, and the food container has at least two (male or female) parts. The food container can lock on to the field of the interlocking system. The two parts of the food container can lock onto two parts of the field. Another food container can lock onto another two parts of the field and can be repositioned into another position while the first food container is kept locked on its original position by changing at least one of the parts of the field the second food container locks onto.

In a connected state the food container is preferably connected to the surface of the tray by at least two male parts that engage corresponding female parts. Such a connected state allows for a more stable connection and position lock of the food tray and food container. By providing an interlocking system that has at least two parts connected rotational stability is obtained.

Preferably the interlocking system comprises male and female parts that are formed having a form realising shape. Embodiments of the invention provide an interlocking system free of snap-on systems that require an active unlocking of the system. The male part can be positioned into the female part by moving in a first direction countering a resisting force, preferably a frictional force, and the male part is released from the female part by moving in the opposite direction, again countering a resisting force preferably a frictional force, without the need of a further releasing of unlocking action. Such an interlocking system is user friendly.

Preferably the interlocking system is of the push-pull type allowing connecting of the food container to the food tray by pushing and allowing disconnection by pulling. Preferably the male part is pushed into the female part or the female part is pushed onto the male part countering a clamping force which clamps the female part onto the male part. The clamping force provides the force for the interlocking system to position the food container onto the tray.

In an embodiment the interlocking system provides for a connecting strength of at least enough strength to resist turbulence during a flight. In connected state such a connecting strength will prevent the falling over of food containers and in particular drinks during unexpected turbulence, but also during initial distribution by flight attendants.

In an embodiment the connection strength is at least 0.2 N per connected male and female part, and preferably at least 1 N. The length of the frictional contact of the male and female parts can be arranged to set the connection strength.

In an embodiment a two components molding technique is used for manufacturing the male or female parts, especially if the male and/or female parts are integrally formed with the food tray and/or food container. A high friction component is used for manufacturing the male/female parts.

In an embodiment in the connected state the interlocking system provides for a connecting strength of at most 10 N per connected male and female part. Such a limitation will result in ease for unlocking and releasing the food container from the food tray. It is advantageous to have the connection strength of a single male/female connection limited to less than 4 N.

Preferably the total amount of connecting strength of a food container through the interlocking system is limited to 50 N, preferably less than 40 N, more preferably less than 30N. Preferably two, three, four, five or six male/female connections are made if the food container is connected to the food tray.

In an embodiment a first food container and a second food container have differently formed parts of the interlocking system for connecting to the field of parts of the tray. In this manner the position of the food containers can be arranged.

Preferably the food container comprises female parts and the food tray comprises male parts. The field of male parts formed on the food tray forms projections onto with the female parts can be locked. The male parts project from the tray surface. The generally flat surface of the tray comprises a field of upwardly projecting male parts. Under foreseeable or normal operation conditions the male parts will project upwards. The female, hollow parts will be positioned over the male parts. This prevents collection of dirt in the female parts.

The tray can be disposable. The tray can be formed using an injection molding technique from a plastic. The tray can comprise strengthening ribs or bars, preferably positioned as cross beams at the other side of the tray from the interlocking system. This will allow forming a tray from plastic having sufficient rigidness, being stiff and not flexible.

The tray can comprise drains, formed by channels or hole in the tray surface. This will prevent water or other liquids to collect in between the interlocking systems resulting in contamination of the tray and/or container(s).

In an embodiment the field of interlocking is formed on one side of a sheet, e.g. a tray, while the other side comprises a different material, e.g. a different plastic, preferably a anti-slip material. The anti-slip material will contact a support, such as a table, while the interlocking systems extends from the one side of the sheet.

Preferably the surface of the tray comprises a field of regularly spaced male projections. The food container is positionable over the entire field or a part of that field. By providing a regular field of projections, food containers having more than one female part for connecting to the male part can be positioned at multiple location on the field. The field can have a regular structure such as rectangular, preferably square array of projections. Of course the field does not need to be square or rectangular. In a further embodiment the projections can be positioned according to a skewed grid. In a different embodiment the grid can be a honeycomb grid.

In a preferred embodiment each male part is formed by a generally circular projection. The field of male projections has a cylindrical basis extending from the surface of the food tray.

It is further advantageous to form each male part having an inclined projection. In an embodiment the male part is dome or cone shaped. In an embodiment the male part is pin shaped. Such a male part has a guiding structure for guiding a subsequently positioned female part to a position aligning the male and female parts and eventually into a locking position. In particular a field of dome shaped projections can have a user friendly appearance as well as a user friendly operation.

In an embodiment the male projection comprises a cylindrical part and a dome shaped end part projecting away from the surface.

The interlocking system is a combination of a female part on a first implement of the assembly and a male part of a second implement of the assembly. The male part is a projecting part that can be received in the female part. The female part preferably comprises an insert for receiving a male part. In an embodiment the insert is surrounded by a number of edges for engaging the male part.

In an embodiment the female part and in particular the bottom side of the food container comprises one, two or more side walls forming an insert between the side walls. These inserts can cooperate with projections, said projections being adapted to be inserted into clamping engagement with the side walls. In an embodiment the female part comprises one or more secondary projections in between the side walls, said secondary projections and the side walls of said female part being adapted to be inserted into clamping engagement with the projections of the male part. Said secondary projection is part of clamping arrangement. A female part of the present invention allows a stable connection with a male projection. Preferably, the secondary projections are flexible.

Such a female part can be manufactured using a injection molding technique with high accuracy. Tolerances are less than 0.04 mm, but preferably less than 0.01 mm.

In an embodiment the insert is of generally cylindrical form. Since the clamping force of the interlocking system is mostly transferred by frictional contact, large contact surfaces between the male and female parts are preferred.

The secondary projections may project freely away from in an inside of the cavity formed between the side walls. These secondary projections can extend from an inner side of the upper wall of the cavity formed near a bottom side of the food container. The secondary projections may be configured to clamp the primary projections together with the side walls.

The shape of projections (of the male part or the female part) is not critical. The skilled man in the art can adapt many shapes according to the present invention. It has only to be ascertained that the shape of projections allows clamping of male projections with the secondary projections and the side walls. Although it is preferred to provide the projections in cylindrical shape, the projections need not necessarily be cylindrical and the invention actually comprises specific preferred embodiments wherein at least the secondary projections are of a different shape. Preferably, in order to further improve the clamping effect, in any shape of the secondary projection, a portion of the secondary projection spaced from the side wall engages a primary projection of another similar building element. Accordingly, it is preferred that at least one male projection is engaged both, by a side wall and a portion of the secondary projection spaced from the side wall.

It is further preferred that the secondary projections are arranges co-axially with the centre of a square defined by four male projections, the cross section of the secondary projections being defined in such a manner that it touches the cross section of the four male projections defining said square when said cross-sections are geometrically projected normal to the bottom wall.

Preferably, the projections are cylindrical. The circular cross-section of the secondary projections may thus touch the four circular cross-sections of the male projections. Preferably, the secondary projections are hollow cylinders, especially provided with longitudinal slits. Another preferred embodiment of the present invention comprises secondary projections the cross-section of which is substantially cross-shaped. The ends of each arm of the cross are straight so that the contact between male and secondary projections is a linear contact. In another preferred embodiment of the present invention, the interlocking system is characterised in that the secondary projections exert on a male projection a force substantially perpendicular to a opposite side wall, for example, in the form of rectangular blocks. In another preferred embodiment of the present invention, the interlocking system is characterised in that the secondary projections are provided with longitudinal slits. These slits increase the clamping effect of these projections when interlocked with four male projections of an adjacent element.

In an embodiment the bottom side of the food container comprises at least two adjacent female parts each formed by an insert, the female parts formed in a generally flat bottom surface of the food container. The adjacent female parts can engage onto two male projections of the field of projections of the food tray.

In an embodiment the female part is formed having secondary protrusions. In between the secondary protrusions, inserts or cavities are formed for receiving male parts. Preferably a field of secondary protrusions is provided, forming a field of cavities or inserts for positioning male parts. Preferably the field has a regular pattern. A rectangular array is preferred. A honeycomb array is also advantageous. In an embodiment the array is chequers like pattern. Such arrays allow engaging and clamping of male parts from at least four sides.

In an embodiment the food container and the food tray are formed having the same or a similar arranged interlocking system. The male part and female part could be indistinguishable. In an embodiment the interlocking system could be formed by two fields of projections from a surface, in particular circular projections from a surface. Such an interlocking system is preferred for cleaning and manufacturing properties. The amount of interlocking forces can be adapted by e.g. the length of the protrusion. Any of the features described in this application in relation to protrusions could be combined with this specific embodiment.

The food tray and in particular the food container according to the present invention can be made with any material suitable for providing the necessary stability. Preferably, those materials are used which have been proven to be suitable for the manufacture of toy building elements, such as plastics, wood or metals. For example, the implements can been made of cellulose acetate (CA). CA, however, has problems with discoloration and warping. In the course of the present invention it could also be shown that acrylonitrile butadiene styrene (ABS) is suitable material for manufacturing the present building blocks. Other preferred materials are SNA or PET-material.

Food containers made of such plastics are more resistant to heat, acids, salt, and other chemicals than cellulose acetate (CA). In addition it is non-toxic.

A two components molding technique can be used for manufacturing the food tray or food containers.

The food tray can have one or more projecting upward edges, preferably circumferential edges, which surround the generally flat surface for supporting the food containers. The food tray can have one or more handles for ease of manual handling. In an embodiment the food tray has an edge surrounding the support surface. The food tray and in particular the edge can have an interlocking system for connecting to a tray cover. In this way the food can be preserved in the covered tray. The tray cover can be removed. In a preferred embodiment the interlocking system of the tray cover also comprises male and female parts according to any of the above mentioned features. In an embodiment the tray has at least one handle. This allows operator friendly handling of the tray.

Preferably the assembly further provides cut ware. In a preferred embodiment the cut ware is provided with the interlocking system for positioning and releasably locking the cut ware onto the food tray.

In an embodiment the assembly further comprises a transport trolley having a frame and support devices for supporting multiple trays. The transport trolley can comprise a door. The door can comprise a pivot or a snap-on release mechanism for opening and closing the door. The trolley can comprise a house. The support devices for the tray are preferably positioned inside the house. The inner space of the house can be closed and opened with the door.

The assembly can further comprise an airplane having a fuselage and an alley for distributing the tray to passengers sitting on passenger seats adjacent the alley.

According to another aspect the invention also concerns use of an interlocking system of male and female parts for positioning and releasably locking food containers such as a cup and a plate, to a food tray, wherein a bottom side of the food container and a generally flat surface of the food tray comprise an interlocking system for interlocking the food container onto the tray surface, the tray surface comprising an area of (male or female) parts of the interlocking system for providing multiple positions for positioning the food container on the tray.

According to another aspect the invention also concerns the use of an interlocking system in an airplane. The interlocking system comprises male and female parts for positioning and releasably locking food containers such as a cup and a plate, to a food tray, wherein a bottom side of the food container and a generally flat surface of the food tray comprise an interlocking system for interlocking the food container onto the tray surface, the tray surface comprising an area of (male or female) parts of the interlocking system for providing multiple positions for positioning the food container on the tray.

The invention is not limited to use in airplane. Other vehicles such as a train, a boat or a cruise ship could form an area where a platform like a tray or another support for drinks can be used and where an interlocking system according to the invention can be put to practice.

The invention will be explained in further detail referring to the drawing. However the invention is not limited to the shown embodiments. From the drawing the skilled person will be able to recognize features that could be a part of the claimed invention. The skilled person will be able to recognize that parts or features shown in the drawing can be used separate from the shown embodiment. The invention is not limited to the explicit features shown in the embodiment. The skilled person will be able to recognize implicit features. The invention according to this application or a subsequent divisional application can be directed to any of the implicit or explicit feature mentioned in the description or shown in the drawing. The invention encompasses all embodiments that combine the feature or the spirit of the invention according to the claims.

The drawing shows embodiments of the invention:

FIG. 15 shows an embodiment of a flexible underground according the invention.

FIGS. 16A-16B show an example of a food container to be used in combination with the invention FIG. 17A-17B show examples of food container and cutlery to be used in combination with the invention.

Figure 1:
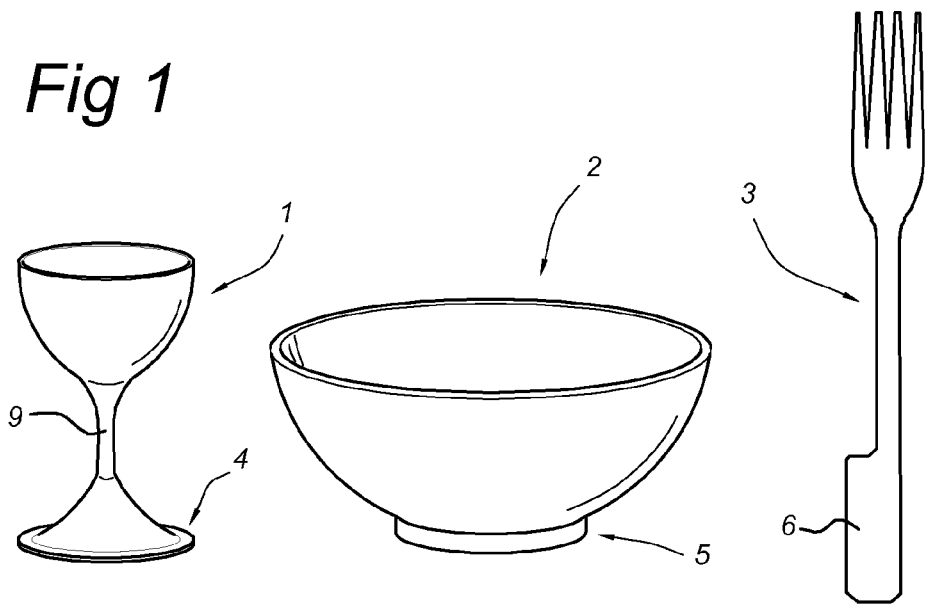
FIG. 1 shows examples of flatware and cutware to be used in combination with the invention.

FIG. 1 shows three examples of tableware such as stemware, flatware and cutware that can be part of an assembly or use according to the invention. FIG. 1 shows a cup, here in an embodiment similar to a wine glass. The cup is an example of a food container that can contain food, here a liquid and that can be used in a transport vehicle such as an airplane. The cup 1 can be presented to a user using a tray. Different liquids can be used in combination with the cup.

The cup 1 has a foot 4 at a bottom end of the food container. It will be clear that the cup can have different dimensions. The container can have a shorter shaft or stem 9 to lower the center of gravity in particular when the container is filled. In embodiments of the invention the stem 9 is not present. In some embodiments the foot and bowl are closer together, in preferred embodiment integrally formed. Examples of stemware suitable to be used in combination with the invention are a beaker, beer stein, tankard, flagon, chalice goblet, a mug or cup and in particular a coffee or tea cup or mug.

Bowl 2 is an example of flatware for presenting solid or partially liquid food. Bowl 2 is an example of a dish that is used extensively in the airline industry. Bowl 2 has a high edge for containing the food. In an embodiment the bowl 2 is presented with a cover. Bowl 2 and other examples of dishes or cups or food containers will have a bottom part 5 used for positioning the bowl 2 on top of a support surface.

Fork 3 is an example of cutlery to be used in embodiments of the invention. Fork 3 according to this example is provided with an extended part 6 near an end of the fork's shaft. The part 6 will be used to connect the fork 3 to a surface.

Of course many other examples of tableware are known to the skilled man. The invention can combine all known utensils for aiding during eating with the invention, as will be clear from this description.

Figure 2:
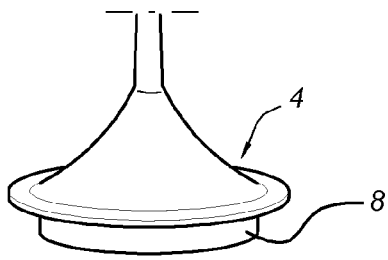
FIG. 2 shows a detail of a bottom side of a cup according to an embodiment of the invention.

FIG. 2 shows a detail of the foot of the cup 1. Foot 4 is provided with an extension 8. However the skilled man will understand that a dish 2 or a fork 3 can be provided with a similar extension 8. The extension 8 is provided with a part of an interlocking system according to the invention.

The tableware 1,2,3 according to the invention can be manufactured using injection molding. Preferably the tableware 1,2,3 are disposables. In a preferred embodiment the extension 8 is integrally formed with the food container 1,2.

In an embodiment the extension 8 is a separate piece. The extension part 8 can be connected to the tableware 1,2,3. In an embodiment the extension 8 is formed using injection molding.

In an embodiment the extension 8 is provided with connection devices for connecting it to tableware 1,2,3. In an embodiment the extension 8 is connected to tableware of different materials. In an embodiment the injection molded extension 8 is connected to a glass 1. In the airline industry glasses can be used for business of first class passengers. Such glasses can be provided with the extension 8 and are embodiments of assemblies according to the invention using the interlocking system.

Figure 3:
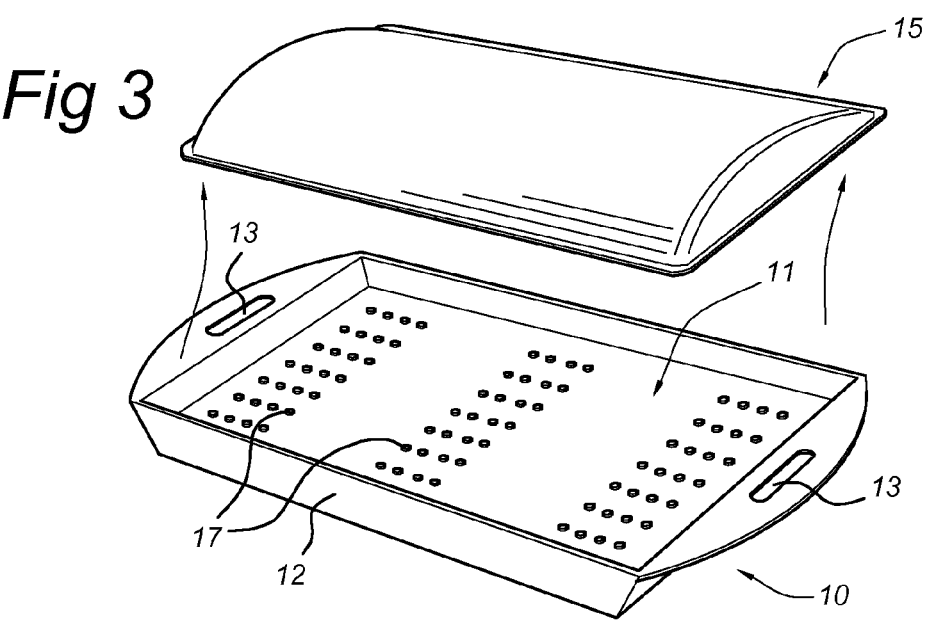
FIG. 3 shows an embodiment of a food tray according to the invention.

FIG. 3 shows an example of a food tray 10. In the shown embodiment the food tray 10 comprises a generally rectangular surface 11 for support food containers such a cup 1 or dish 2. The food tray 10 can be used to support a combination of food containers 1,2. In an embodiment the food tray 1 is used as a plate to present a drink to a passenger.

In this embodiment the food tray 10 comprises an edge 12 surrounding the surface 11. The edge 12 will prevent a spilled liquid collected on the surface 11 to flow of the food tray. The edge 12 comprises in the shown embodiment handles 13. In an embodiment the food tray has one handle. In an embodiment the handle 13 can comprise a grip adapted to the hand of the user.

The food tray 10 can be formed using injection molding. The invention is not limited to this technique.

FIG. 3 shows a tray cover 15. The cover can be connected to the tray 10. In an embodiment the cover is an disposable cover such as an aluminum cover. The cover can be releasably connected to the tray. In an embodiment the cover 15 is a tear-off cover.

Figure 4:
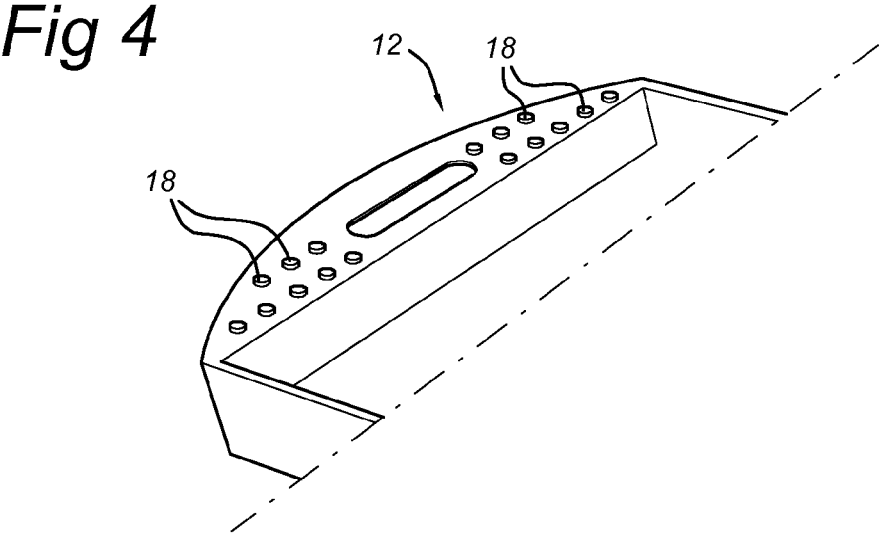
FIG. 4 shows in detail another embodiment of a food tray according to the invention.

FIG. 4 shows a detail of an edge 12. The edge is provided with parts 18 of the interlocking system according to the invention. In an embodiment the cover 15 is provided with part of the interlocking system according to the invention and can be connected to the food tray using the interlocking system according to the invention.

Surface 11 of food tray 10 is provided with parts of the interlocking system according to the invention. In the preferred shown embodiment the parts 17 are male part, projecting upwards from the surface 11. In another embodiment the part 17 are female parts arranged to receive male parts of the interlocking system.

The parts 17 are positioned in a regular pattern on the surface 11. In an embodiment only parts of the surface 12 are provided with parts 17. In an embodiment the surface 12 can be provided with first and second parts 17, wherein the first and second parts have different dimensions or are arranged in different patterns on the surface 11. In an embodiment the food tray 10 can have multiple surfaces 11 provided with parts 17.

Preferably the parts 17 form a field of multiple parts of the interlocking system according to the invention. In the embodiment shown in FIG. 3 a field of 8×4 parts is formed on the surface 11 of the food tray 10. The size of the field is at least 2×1 parts and preferably 2×2 parts.

In an embodiment the food tray comprises a separate element on the surface 17 that comprises the male part. Preferably the separate element is a mat. The mat can comprise a high friction material on the one side and the male projections on another side. Such a mat can be used to use food trays already manufactured in combination with the interlocking system according to this invention. In particular the mat uses the large area of contact between the mat to allow to lock the position of the mat with respect to the tray and uses the interlocking system to make a position stable connection with the tableware element. Such a mat can be the subject of patent protection.

In an embodiment the male projections are provided on the food tray by providing an attachment.

Figure 5:
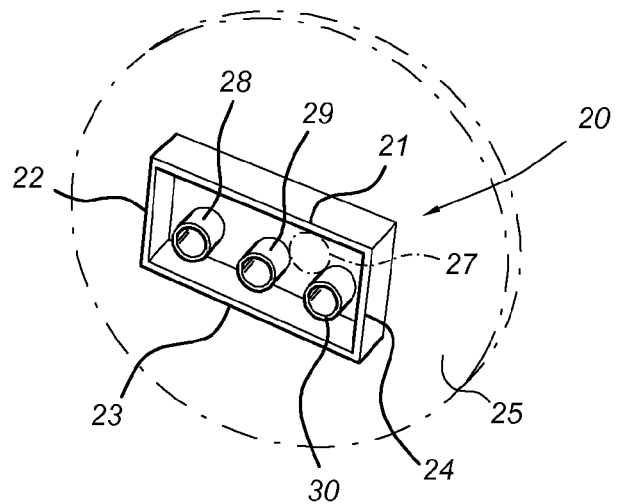
FIG. 5 shows a first embodiment of a female part of the interlocking system according to the invention.

FIG. 5 shows an embodiment of a part 20 to be used in combination with an interlocking system according to the invention.

FIG. 5 can be an embodiment of the extension 8 shown in FIG. 2. FIG. 5 can be view of a bottom side of a cup 1 or a dish 2 according to the shown embodiments.

FIG. 5 shows a part 20 formed by side walls 21-24. The side walls 21,24 extend in this embodiment from a back surface 25, e.g. a bottom part of foot 4.

The part 20 in the embodiment of FIG. 5 comprises eight female parts that can receive male parts, in this embodiment preferably circular or at least partially cylindrical male parts. One male part 27 received in part 20 is shown in dashed lines.

The eight female parts are formed in between the side walls 21-24 that cooperate with secondary projections 28-30. These secondary projections extend from surface 25 and are formed in this embodiment as hollow cylindrical projections. The side walls and secondary projections are preferably formed by injection molding. The side walls and secondary projections are preferably formed with a plastic. The side walls and secondary projection show some elasticity.

The shape of male and secondary projections is not critical. The skilled man in the art can adapt many shapes according to the present invention. It has only to be ascertained that the shape of primary and secondary projections allows clamping of male projections 17 with the secondary projections 28-30 and the side walls 21-24. Although it is preferred to provide the projections in cylindrical shape, the projections need not necessarily be cylindrical and the invention actually comprises specific preferred embodiments wherein at least the secondary projections are of a different shape. Preferably, in order to further improve the clamping effect, in any shape of the secondary projection 28-30, a portion of the secondary projection 28-30 spaced from the side wall 21-24 engages a male projection 17 of another similar element to with part 20 is to connected. Accordingly, it is preferred that at least one male projection is engaged both, by a side wall and a portion of the secondary projection spaced from the side wall.

It is further preferred that the secondary projections 28-30 are arranges co-axially with the centre of a square defined by four male projections, the cross section of the secondary projections being defined in such a manner that it touches the cross section of the four male projections defining said square when said cross-sections are geometrically projected normal to the bottom surface 25.

Preferably, both male 17 and secondary projections 28-30 are cylindrical. The circular cross-section of the secondary projections may thus touch the four circular cross-sections of the primary projections. Preferably, the secondary projections are hollow cylinders 28-30. In an embodiment the secondary projection are provided with longitudinal slits.

In an embodiment the secondary projections are missing. However this results in a loss of connection strength.

Figure 6:
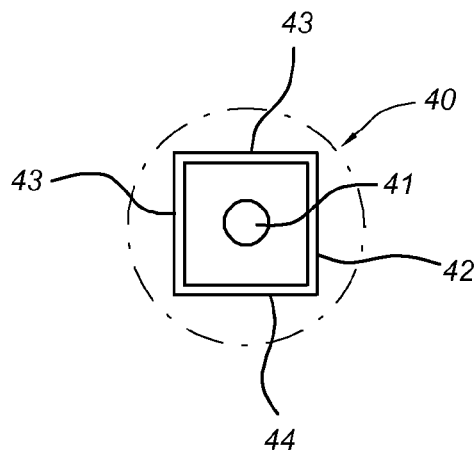
FIG. 6 shows a second embodiment of a female part of the interlocking system according to the invention.

FIG. 6 shows another embodiment. Part 40 comprises a single secondary projection 41 surrounded by four side walls 42-45.

Figure 7:
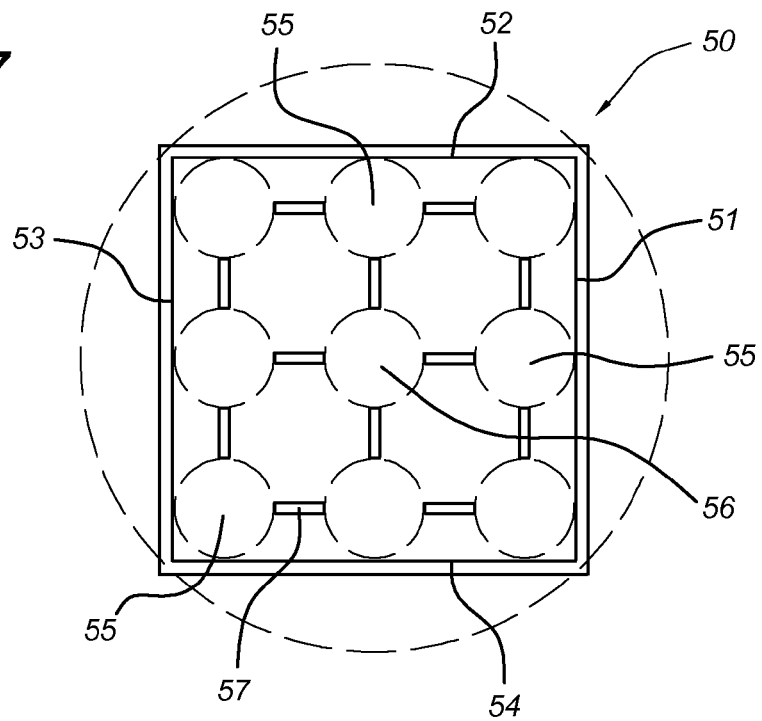
FIG. 7 shows a third embodiment of a female part of the interlocking system according to the invention.

FIG. 7 shows a third embodiment 50. Device 50 comprises nine female parts, which can clampingly engage nine male parts 55 shown in FIG. 7 by dashed lines. In this embodiment again four side walls 51-54 surround a cavity in which secondary projection formed by rectangular walls 57 in a chequerslike arrangement. Nine male parts 55 in a 3×3 arrangement are engaged by the side walls and secondary projections. Male part 56 is engaged only by secondary projections.

In this preferred embodiment of the present invention, the female parts are characterised in that the secondary projections 57 exert on a male projection 55 a force substantially perpendicular to a opposite side wall, for example, in the form of rectangular blocks.

In another preferred embodiment of the present invention, the female part is characterised in that the secondary projections 28-30, 57 are provided with longitudinal slits. These slits increase the clamping effect of these projections when interlocked with four male projections of another element of the assembly.

In a further embodiment, strengthening ribs are provided in between ribs 57 forming strengthening ribs between the outside walls 52,54 and 51,53. These strengthening ribs allow a reduction of the total material used for forming the food container, by providing sufficient stiffness to the side walls 51-54.

Device 60 can be positioned on the surface 12 of a food tray 10. The male parts extending from the surface are received in the female parts. Base 68 or device 60 will come into contact with surface 12 if the interlocking system is completely used by the operator, preferably a passenger. The surface 12 will function as a stop for the interlocking system. This will prevent the build up of clamping force that is too high.

The interlocking system provides a position lock system that can be released with ease. The user will readily use the system if the user is not hindered too much. The release force should not be too high. Otherwise the user is not able to release the engaged article from the locked position. In an embodiment the tray is held by an attendant. If a different user is trying to release an article from a locked position, the resistance should not be too high as otherwise the article is not released and the user will exert a force on the complete assembly of tray and article.

Figure 8:
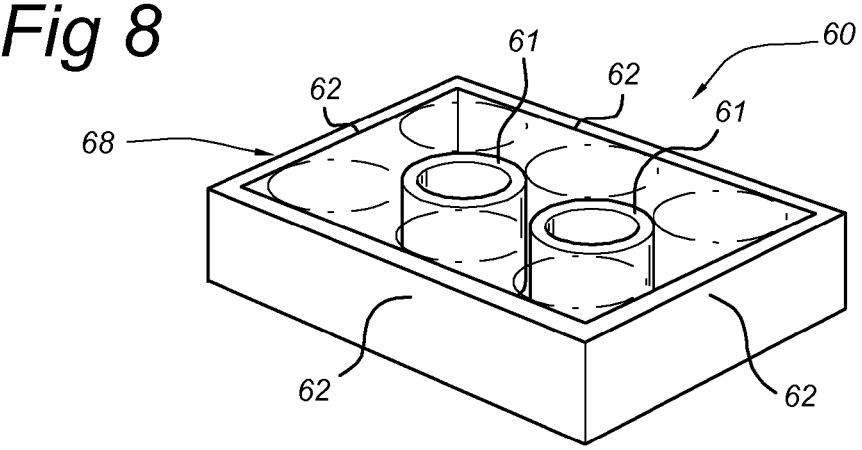
FIG. 8 shows a fourth embodiment of a female part of the interlocking system according to the invention.

FIG. 8 shows a perspective view of a device 60 that can be connected to a tableware. Device 60 is constructed and arranged to clamp six male parts between secondary projections 61 and side walls 62.

Figure 9:
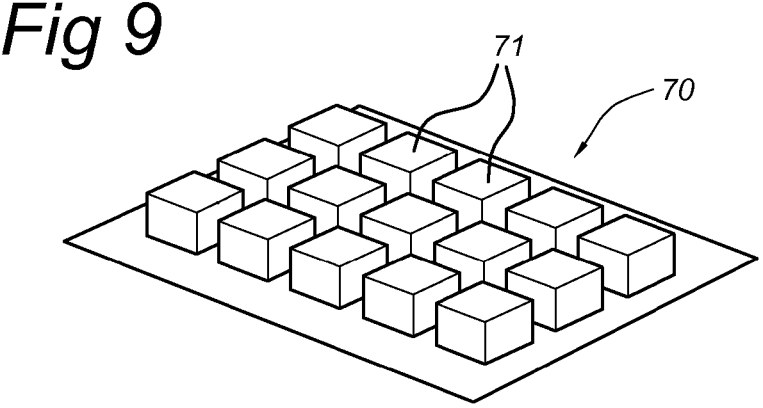
FIG. 9 shows a first embodiment of a male part of the interlocking system according to the invention.

FIG. 9 shows a field 70 of male parts 71. In this embodiment the male parts have a rectangular, preferably square cross section. The male parts 71 can be part of a field of male parts of an interlocking system according to the invention formed on a surface of a food tray.

The male parts 71 are positioned in a regular pattern. If the parts 71 are to be used with the female parts of the embodiment according to FIG. 7, the parts 71 are engaged and clamped between the side walls and secondary protrusions. The female and male parts are moved toward each other and the male portion is received in the female portion. The male and female portions are dimensioned in such a manner that a frictional force and clamping force will result in an interlocking system. The interlocking system allows locking the position of the male and female parts with respect to each other. A releasing force will be necessary to release the male and female parts.

The interlocking system according to the invention is similar to the well-known Lego® system.

Figure 10:
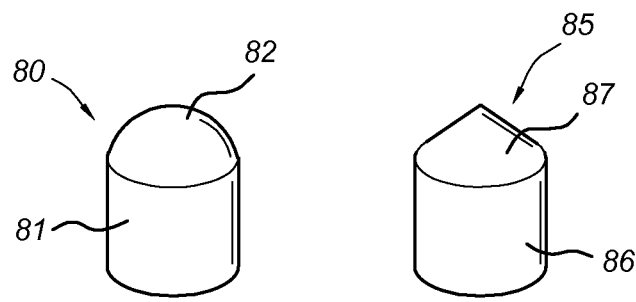
FIG. 10 shows a second embodiment of a male part of the interlocking system according to the invention.

FIG. 10 shows different examples of a male part to be used in combination with the interlocking system according to the invention. Male part 80 comprises a circular base 81 having a constant cross section (radius) over at least a length of 1 mm. This base portion can be engaged and clamped by a female part according to the shown embodiments.

On top of the base 81 a dome-shaped end 82 is formed. Such a male part will have a user friendly feel. In particular when the field of part for the interlocking parts is formed by such male parts, such a field will have a soft tough.

FIG. 10 shows a different embodiment of a male part in male part 85, also having a circular base 86, but having a cone like end 87.

Both the cone like end 87 and dome shaped end 82 will, in particular if arranged in a field of male parts, act as guiding device for guiding a female part to a position in which the element connected to the female part can be locked. The dome 82 and cone 87 guide e.g. a side wall 21-24 towards a side of the base 81,86, at which position the male part can be received in the cavity of the female part.

Figure 11:
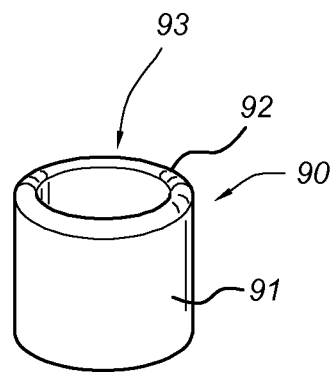
FIG. 11 shows a third embodiment of a male part of the interlocking system according to the invention.

FIG. 11 shows another embodiment of a male projection. Here male part 90 is formed as a cylindrical projection having a circular base 91. Near the distal end 93 of the male part 90 a smooth rounded edge 92 is formed. The rounded edge acts as a similar guiding device.

Figure 12:
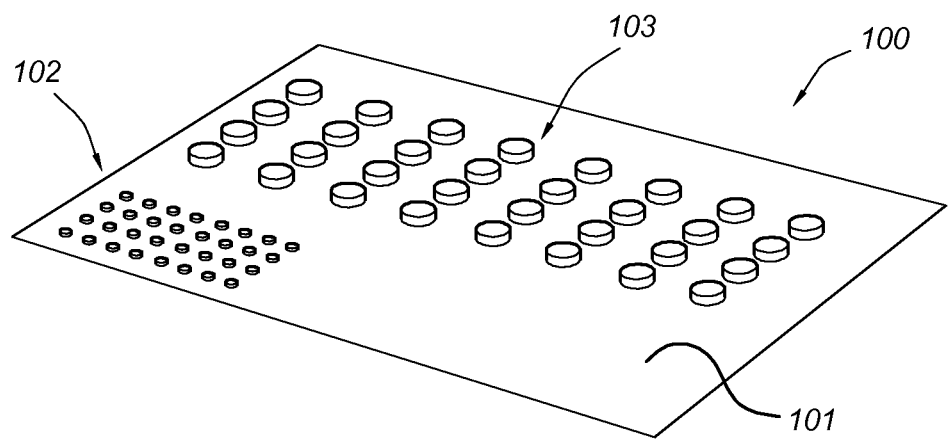
FIG. 12 shows a fourth embodiment of a male part of the interlocking system according to the invention.

FIG. 12 schematically shows a generally flat surface 101 of a food tray 100. The surface 101 is provided with two different male parts arranged in two fields 102,103. This will allow a predetermined arrangement of the tableware that is used in connection with the invention. The interlocking system provided on the tableware will allow only a certain position for locking the dish or cup or even fork. Such a predetermined locking position could e.g. be used for locking the fork at a left hand side of a dish position.

In an embodiment the food container comprises male-like projections and the food tray comprises male-like projections. The male projections of the one part can however be positioned into the inserts between the male projections of the other part. This is an example of an interlocking system according to an embodiment of the invention.

Figure 13:
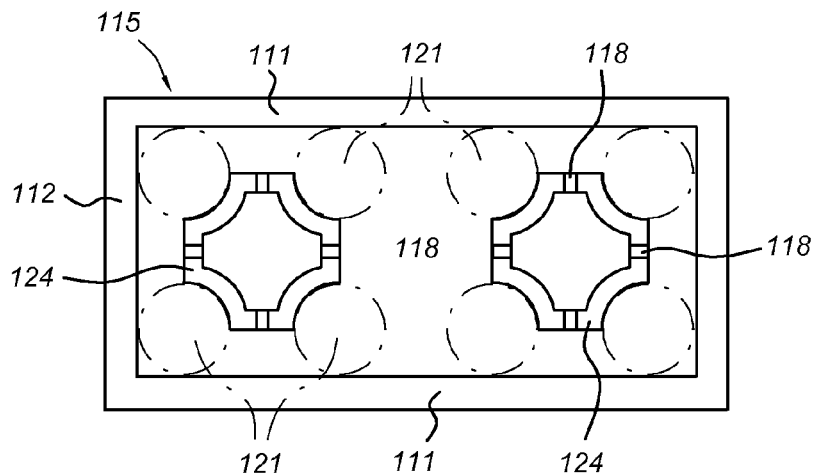
FIG. 13 shows a fifth embodiment of a female part of the interlocking system according to the invention.

FIG. 13 shows another example of female parts. Here secondary projections 124 are provided with longitudinal slits 118. These slits increase the clamping effect of these projections when interlocked with four primary projections of an adjacent element. Side wall 111-114 cooperate with secondary projections 124. The secondary projection 124 is arranged to engage on circular male parts 121. The secondary projection is arranged to have a large area of contact with the male part. Now two secondary projections can be used to engage at most eight male projections.

Figure 14:
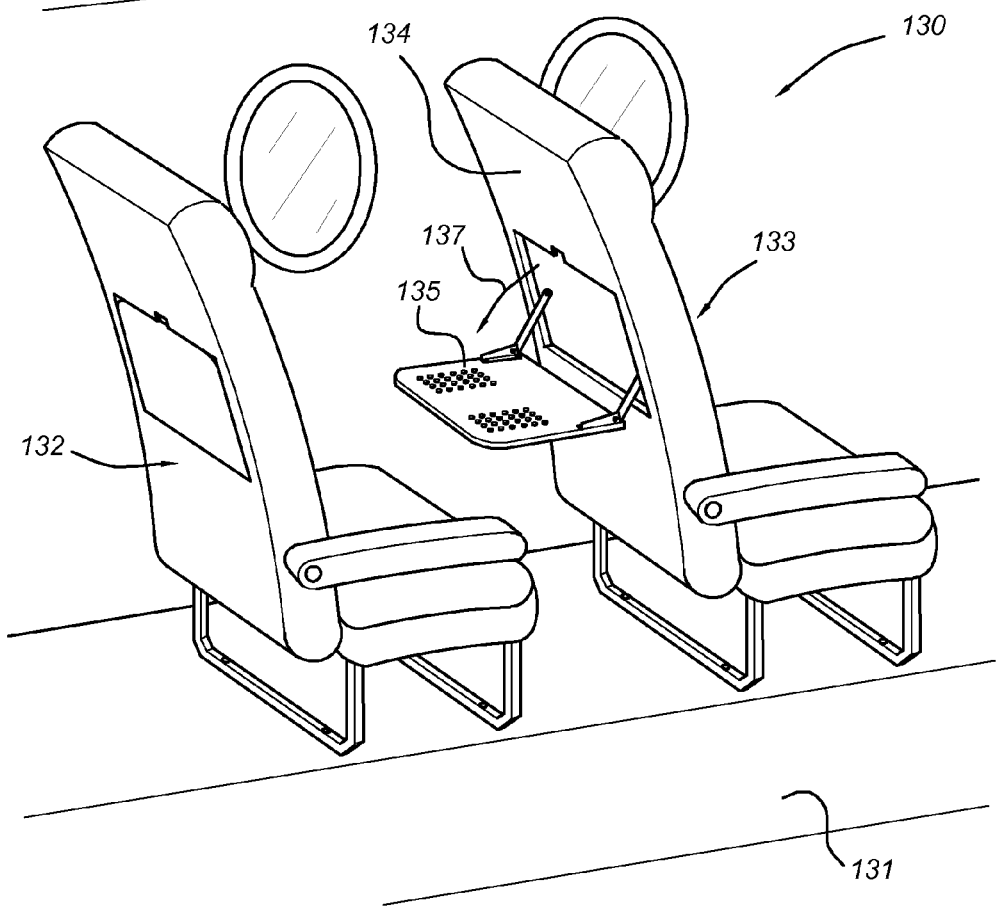
FIG. 14 shows an embodiment of an embodiment of a fuselage of an airplane.

FIG. 14 shows the inside of an airplane, in particular a fuselage 130 having an alley 131. Adjacent the alley 131 passenger seats 132 and 133 are positioned. The back part 134 of seat 133 is provided with a table 135 that is connected to seat 133 with a pivot allowing a stowaway position if moved according to arrow 137. The table can be provided with parts of an interlocking system. A food tray or tableware such as a cup is distributed by a flight attendant and can be positioned on the table 135 and the position of the food tray or the cup can be locked using the male-female interlocking system according to any of the embodiment of the invention. This will allow the maintenance of a position of especially drinks during turbulence.

As shown in FIG. 15, in an embodiment of this invention a mat 150 of a flexible material, preferably a plastic material is provided. The mat comprises a first surface 151 and a second surface 153. The first side or surface comprises a surface to be put in contact with another surface. It can comprise a high friction material. The other side can comprise a part of an interlocking system, preferably an interlocking system according to the invention, for example using male interlocking parts 152. The mat can be used in mobile or travel catering applications. It could be a hand-out. Manufacturing costs are low. Such a mat could be reusable. The mat allows applications of the interlocking system in environments that are not adapted to the interlocking system. One end 155 of the flexible mat is still winded up. The mat 150 can be made of a flexible material, such as a plastic. Surface 153 is in an operational mode as it forms a generally flat surface of interlocking parts 152.

The flexible mat may also find applications, for example involving young children. In an embodiment the placemat comprises an side-wall extending upwards from the field of interlocking elements. Such an upstanding sidewall allows containing a spilt drink on the placemat.

FIG. 16A shows an example of a plate or bowl 161 that can be interconnected with a food tray of flexible mat 150. The plate or bowl 161 has a recess 160 to place food in, and male interlocking parts 162 on top and female interlocking parts at the bottom (not shown). The interlocking parts at the top fit inside the bottom parts, thus allowing the plate 161 to be stacked. FIG. 16B shows an example of four such plates 161 in a stack 165.

Although interlocking parts 162 are suitable for making an interlocking connection, such parts are not a field of interlocking parts allowing releasable locking of containers at multiple positions. According to the invention a single fields of interlocking parts is larger than the number of interlocking parts of the food container.

Further a hole 169 is provided near the upper right corner. The hole functions as a drain for e.g. dishwasher water that could be received in the hollow end forming the foot of the food container, comprising the interlocking parts of the interlocking system. Multiple drains can be formed. In an embodiment the drain is formed in the male part extending upwardly. In an embodiment the drain comprises a channel extending at least partially along a side surface of the bowl 161.

FIG. 17A shows further examples of a children's food container that can be used according to the invention. When a young child places a container such as a beverage cup 170 back down on the mat 150, the child will not always exert the necessary force, or indeed have the required precision, to interlock the interlocking parts of cup and mat. Therefore, it is advantageous to arrange and construct the containers in such a way that they may be stably placed on the mat without interlocking. This can be achieved for example by designing the cup with a wider base 174. Another approach can be to equip the bottom of the cup with a higher friction material.

Near the upper end of the foot or base 174, a hole 179 is provided, just underneath the actual food container, in this case beverage receiving space, forming the upper part of the food container 171. The hole 179 functions as a drain for e.g. dishwasher water received in the hollow base 174, in particular when the food container is positioned upside-down.

FIG. 17B shows further examples of children's cutware, such as a fork 171 and a spoon 172. In an embodiment of the invention, these pieces of cutware can be interlocked on the mat in an upright position using a female interlocking part in the base 173 of the fork or spoon, or they may be interlocked in a flat position, using female interlocking parts (not shown) along the length of the fork or spoon. The fork 171 and spoon 172 may also be equipped with male interlocking parts 175 along their lengths, so that they for example, fork 171 can be interlocked, in flat op upright position, on top of the flat spoon 172 in FIG. 17B.

Figure 18:
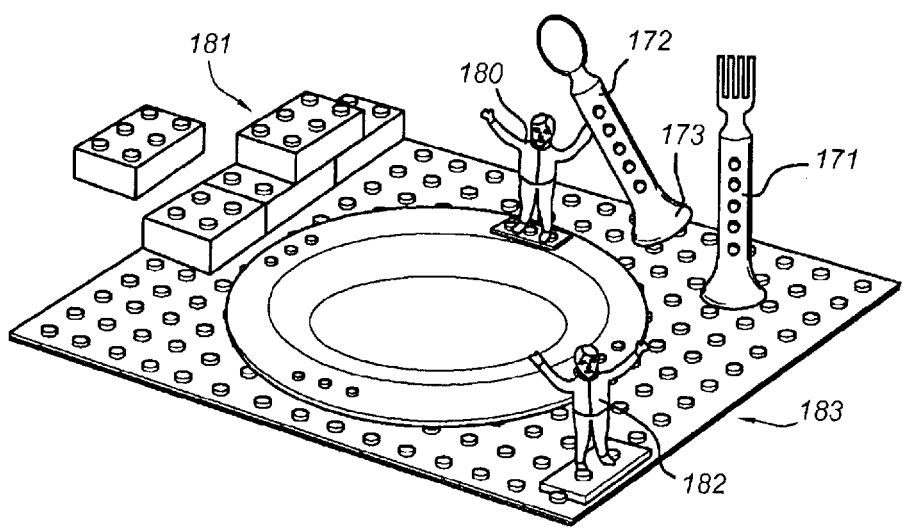
FIG. 18 shows an example of an assembly according the invention in connection with existing toy parts.
Figure 18A:
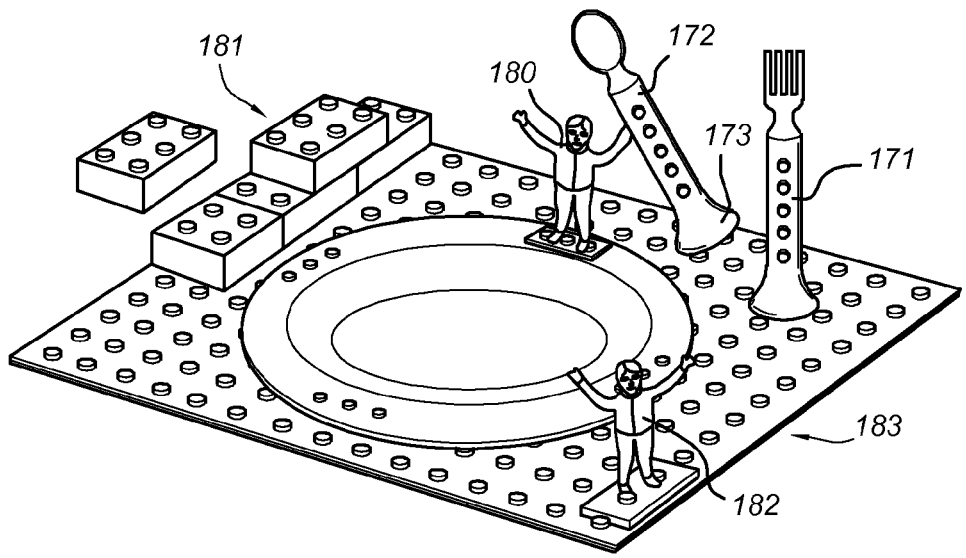

FIG. 18 shows an example of the use of elements (mat 150, fork 171, spoon 172, plate 183) described above in connection with other, compatible, toy parts. Shown are toy FIGS. 180 and 182, and a stack of toy bricks 181. The toy FIG. 180 standing on the plate thus interlocks with the male interlocking parts on the plate 182, while the female interlocking parts of the spoon 172 also interlock with interlocking parts on the FIG. 180. It can be advantageous to make a child more at ease at the dinner table by introducing some of his or hers favourite toys. Parents can also introduce these toys in for example a reward system for children who eat well.

In an embodiment, plate 183 comprises strengthening beams at the other side from the field of interconnecting elements. These beams or ribs provide stiffness to the plate, preventing bending thereof.

In an embodiment also the food containers and/or cut ware are provided with strengthening beams for strengthening the container/cut ware, reducing the total amount of material used.

Figure 19:
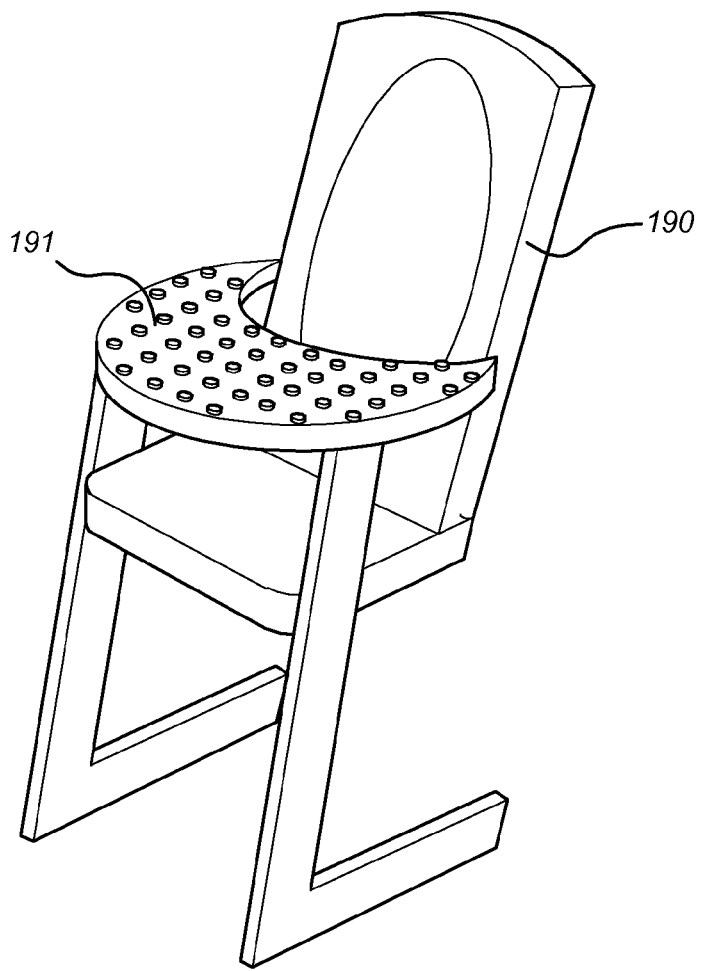
FIG. 19 shows an example of the flexible underground in connection with a children's seat.

FIG. 19 shows an example where the mat 191 is shaped specifically so it will fit well in a children's chair 190. The mat 191 is otherwise similar to the mat 150. It is advantageous for the mat to be compatible with chair 190 if the child eats from a plate provided by the chair. In another embodiment, the mat is not placed on top of a structure of the chair, but is in fact a part of the structure of the chair itself; in other words, the male interlocking parts on it are added to the chair itself.

Figure 20:
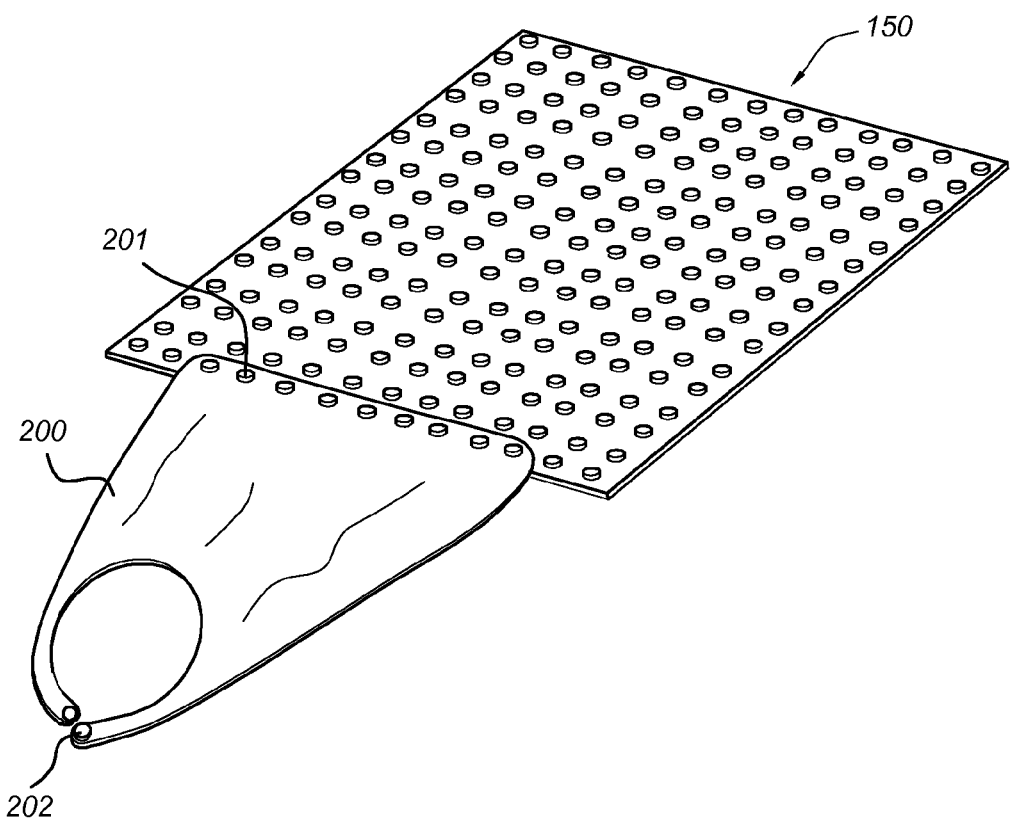
FIG. 20 shows an children's feeding cloth that can be used in combination with the invention.

FIG. 20 shows an example of a child's feeding cloth, to prevent food spills on the child, the chair or the floor, that can be interlocked with the mat 150 using female interlocking parts 201 on the cloth. The cloth is worn around the child's neck by closing connection 202, which may also be constructed using male and female interlocking parts or another arrangement. The advantage is that for a child wearing the cloth that is connected to the mat, there is limited possibility for food or drops of beverage to fall between the child wearing the cloth and the mat. Care must be taken that the child's movements do not drag the mat off the table. One way of achieving this can be to arrange the mat and cloth so that the friction force needed to make the mat's first layer 151 move with respect to the underground that the mat is lying on is larger than the force needed to undo the interlocking connection between mat and cloth.

Any of the objects used in combination with the invention can be provided with a text or image representing a commercial expression. For example the figures 180,182 can be provided with a trademark on the chest. The mat 150 can be provided with a desired trademark. This allows a more commercial exploitation of the plastic elements according to the invention. In an embodiment any of the elements according to the drawings are provided with an embossing or in-mould labelling.

An interlocking system of male and female parts according to the invention can comprise a system of a single male part or a single female part and a field of opposite parts. Preferably a food container or cutlery comprises a single female or male part of the interlocking system. This allows easy placing of the food container or cutlery on the field of parts of the interlocking system.

In an embodiment a female part of a food container or cutlery is arranged to engage onto multiple male part of the field of male parts of the interlocking system. In an embodiment a single female part can engage on a field of four male parts, e.g. a field of 2×2 male parts of a 1×4 field of male parts.

Figure 21:
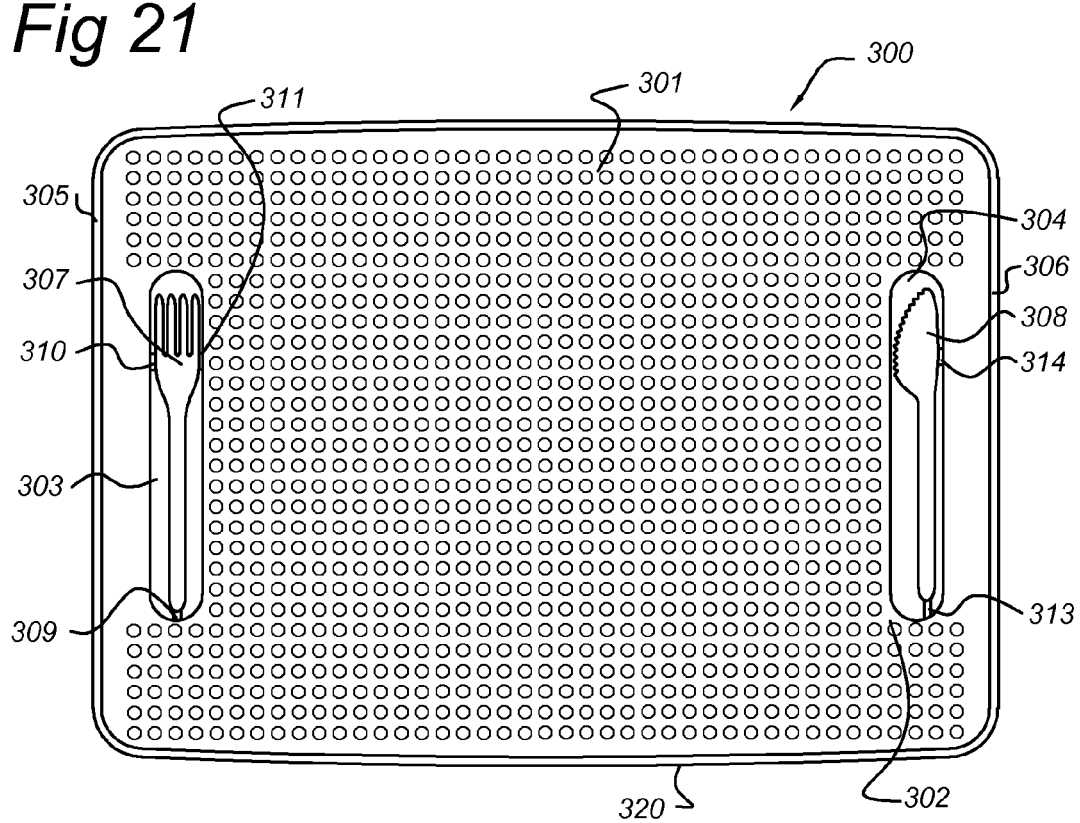
FIG. 21 is a schematic top view of an embodiment of a tray according to the invention.

FIG. 21 shows a further embodiment of a tray to be used in a assembly according to the invention. Tray 300 comprises a field 301 of an interlocking system provided on a bottom 302 of a tray 300. The interlocking system comprises male parts extending upwards from the bottom 302.

Field 301 will allow connecting and lockingly positioning of a food container (not shown in this figure) to the bottom 302 of the tray 300 at random positions. Combinations of food containers and possibly other object can be positioned in desired combinations or at desired positions.

Tray 300 has two openings 303, 304 along side edges 305, 306 of the rectangular tray 300. In openings 303, 304 a fork 307 and a knife 308 are received. Openings 303,304 are arranged in order to allow a user to use the openings as handles for lifting the tray 300. However, fork 307 and knife 308 may be received in openings at an arbitrary location in tray 300, not necessarily in openings along side edges 305, 306.

Tray 300 is provided with a upstanding edge 320 extending upwards, out of the service of the paper surrounding the fields of interconnecting elements 301. In an embodiment also openings 303, 304 are surrounded by a upstanding edge. This will allow to prevent spilling of a liquid from the tray food openings on the a user.

In an embodiment tray 300 is a product manufactured by injection moulding. In an embodiment, tray 300 is a product manufactured by two-component (2K) injection moulding, allowing the use of for example two different colors or materials. Also fork 307 and knife 308 are formed by a form of injection moulding and are connected by a small disconnectable bridge, e.g. bridges 309, 310, 311, 312, 313,314. The bridges form a disconnectable bridge between a perimeter of openings 303, 304 and the fork or knife.

A skilled person is familiar with manufacturing deposable bridges 309-314 in order to allow a user to disconnect the knife and fork 307, 308 from the tray. This technique allows manufacturing a tray, fork and a knife in a single manufacturing step. In particular this will allow manufacturing disposable tray, knife and fork.

In an embodiment further cutlery is included in the tray 300, such as a spoon.

Figure 22:
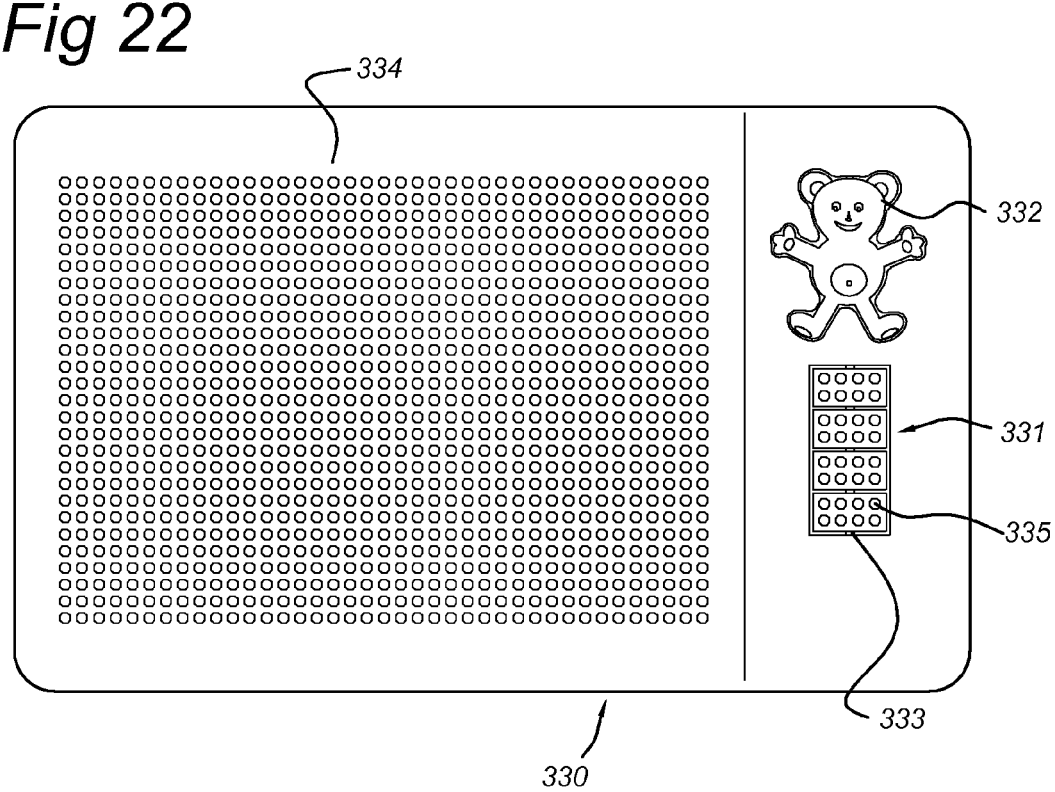
FIG. 22 is a top view of a tray according to the embodiment of the invention.
Figure 23:
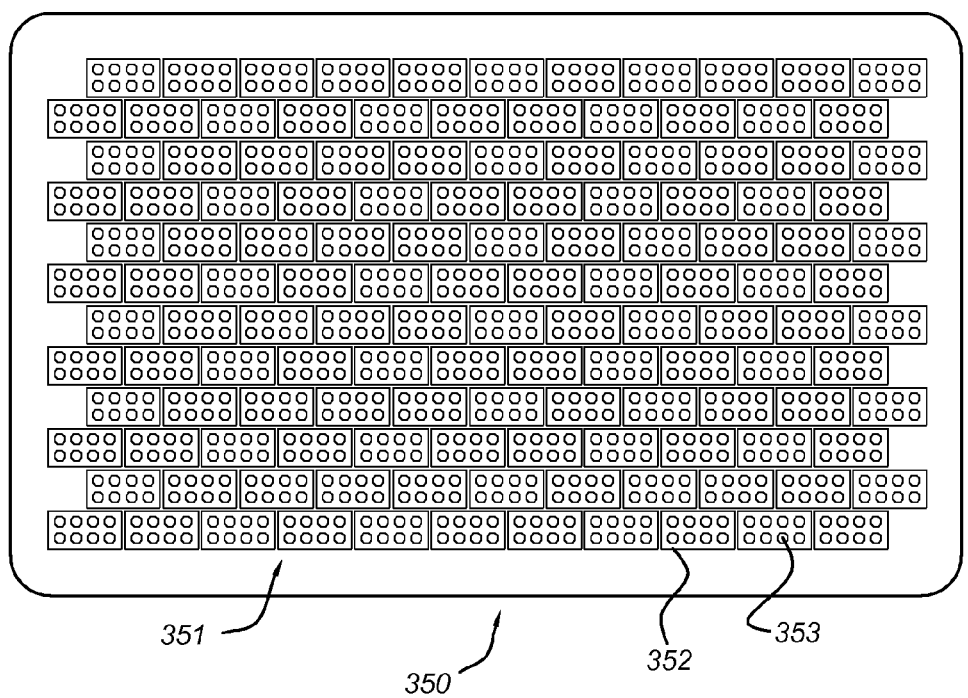
FIG. 23 is a top view of a tray according to a other embodiment of the invention.

It will be clear to a skilled person that fork 307 and knife 308, and indeed all disconnectable elements, such as those discussed in reference with FIGS. 21, 22, and 23, can be connected by other means than disconnectable bridges, such as press-through strips and film hinges.

FIG. 22 shows yet another embodiment of a tray or a placemat 330 according to the invention. According to an aspect of the invention a support for food containers 330 is provided, wherein the support 330 combines multiple functions. The support 330 is arranged to support and lock food containers using a field 334 of an interlocking system and the support further comprises elements such as toy elements 331, 332 releasable connected to the tray 330, e.g. by bridges 333. The toy elements 331, 332 are formed in a single manufacturing step together with the tray 330. The tray 330 is a disposable tray.

The field of interconnecting elements 334 is arranged for supporting and locking food containers, but can also be used in combination with the releasable elements such as the toys 331, 332 for allowing a child to play with the tray. Especially in an aircraft providing a tray 330 according to the invention is advantageous, as the tray first functions as a support used for food distribution, and a second use can be to entertain children and allowing them to play.

In an embodiment elements 331, 332 are provided with interlocking elements allowing connections with the interlocking elements of the field 334.

Elements 331 are arranged as Lego™ elements, known as such, allowing a user to form constructions. In the embodiment according to FIG. 22, elements 331 are provided having a top side with male parts of the interlocking system, in this embodiment eight male parts in a 2×4 rectangular arrangement, and an opposite site provided with female parts allowing connection with male parts.

Male parts 335 are of similar size as male parts of the field 334. In FIG. 22, elements 331 are shown as four similar elements, but according to an embodiment of elements 331 may comprise various Lego™ elements which are not all similar to each other.

Toy element 332 is in the embodiment according of FIG. 22 a press-through element. In an embodiment of the invention a collectors series is provided with a collection of trays 330 each provided with different collectable items 332.

Although FIG. 22 shows a tray 330 having a field 334 adjacent positioned next to the releasable elements 331, 332, other adjacent positions are possible. In an embodiment part of the field 334 can be a releasable part.

An example of a field of interlocking elements provided by releasable elements are shown in FIG. 23. FIG. 23 shows a tray 350 having a field of interlocking male parts 351 formed by a collection of blocks 352, in FIG. 23 depicted as 2×4 rectangular blocks. Each block 352 can be disconnected by a user from the field 351 and from tray 350. The collection of blocks 352 may comprise blocks that are shaped differently than other blocks in the collection of blocks 352.

Each block 352 can be disconnected from the tray or neighbouring block after using the tray for supporting food containers. A child can disconnect the blocks 352 by force. In this way fields 351 of the interlocking system will disintegrate, but this aspect of the invention will allow the child to play with the blocks 352.

Tray 350 comprising the blocks 352 is manufactured in a single injection moulding step, using standard or two-component (2K) injection moulding, and the tray can be a disposable tray.

As shown in FIG. 23 the field of male elements 351 may comprise sets of 2×4 male parts 353 arranged regularly on each block 353, but male parts of adjacent blocks can be displaced irregularly. The female parts of the interlocking system of a food container to be locked with the field 351 is provided with a similarly structured semi-irregular field of female parts. This will still allow placing and connecting, locking the food container or an other object on the field of male parts 351 at different/desired positions, however at a more limited set of positions as compared to e.g. FIG. 21. Not every desired position is possible. Field 351 will allow to position a food container having a cooperating interlocking system at limited positions.

Figure 24:
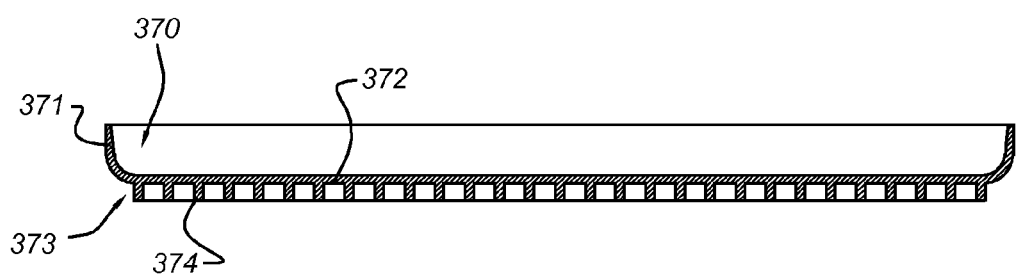
FIG. 24 shows a cross section of a tray comprising the field of the interlocking system for connecting a food container to the tray.

FIG. 24 shows a cross section of a tray 370 wherein the upstanding edge 371 is shown standing upwards from surface 372 comprising the field of the interlocking system for connecting a food container to the tray. At bottom side 373 ribs 374 are formed and shown in cross section, arranged to strengthen the tray 370 in order to allow forming the tray 370 using injection moulding using particularly thin wall thicknesses while providing a sufficiently rigid structure. This allows carrying the tray whilst support multiple filled food containers. Manufacturing using thin walls will save on plastics during manufacturing.

Although the invention was explained using preferred embodiment, it will be clear that the invention allows many different embodiment to obtain a similar locking effect. The application is intended to comprise all embodiments having the features of any of the independent claims.

The invention claimed is:

1. Assembly of a food tray and a food container, wherein the food tray comprises at least one generally flat surface for supporting the food container, wherein the food tray and the food container comprise an interlocking system for positioning the food container on the food tray, wherein the interlocking system comprises male and corresponding female parts provided on the food tray and food container, which male parts are constructed and arranged to lock onto the female parts, wherein the at least one generally flat surface comprises a field of multiple male parts of the interlocking system forming a surface for positioning and releasably locking at multiple positions a bottom side of the food container, said bottom side being provided with a plurality of female parts formed by side walls of the food container, the side walls being adapted to be inserted into clamping engagement with a plurality of the male parts of the generally flat surface.

2. Assembly according to claim 1, wherein the food container and/or or the food tray is formed by injection molding.

3. Assembly according to claim 1, wherein the assembly comprises at least two food containers.

4. Assembly according to claim 1, wherein the field of multiple male parts, comprises at least five male parts of the interlocking system.

5. Assembly according to claim 1, wherein in a connected state the food container is connected to the surface of the tray by at least two male parts that releasably engage four side walls of the food container.

6. Assembly according to claim 1, wherein the interlocking system is of a push-pull type allowing connecting of food container to tray by pushing and allowing disconnecting by pulling.

7. Assembly according to claim 1, wherein in connected state the interlocking system is configured to provide sufficient connecting strength to resist turbulence during a flight, the connecting strength being at least 4 N per connected male and female part and at most 10 N per connected male and female part.

8. Assembly according to claim 1, wherein the interlocking system on the bottom side of the food container and/or the field of the food tray is integrally formed by injection molding.

9. Assembly according to claim 1, wherein the at least one generally flat surface of the food tray comprises a field of upwardly projecting male parts.

10. Assembly according to claim 1, wherein each male part is formed by an inclined projection.

11. Assembly according to claim 1, wherein the surface of the tray comprises a field of regularly spaced projections.

12. Assembly according to claim 1, wherein each female part among the plurality of female parts comprise an insert for receiving a male part, wherein the insert is surrounded by a number of edges for engaging the male part.

13. Assembly according to claim 1, wherein the bottom side of the food container comprises at least two adjacent female parts each comprising an insert, the female parts formed in a generally flat bottom surface of the food container.

14. Assembly according to claim 1, the assembly further comprising an airplane having a fuselage and an alley for distributing the tray to passengers sitting on passenger seats adjacent the alley.

15. Assembly of a food support and a cutlery, wherein the food support in an operational mode comprises at least one generally flat surface for supporting the food cutlery, wherein the food support and the cutlery comprise an interlocking system for positioning the cutlery on the food support, wherein the interlocking system comprises male and corresponding female part provided on the food support and cutlery, wherein the at least one generally flat surface comprises a field of multiple male parts of the interlocking system forming a surface for positioning and releasably locking at multiple positions a side of the cutlery, wherein the cutlery is provided with a corresponding female part formed by side walls of the cutlery, the side walls being adapted to be inserted into clamping engagement with a plurality of the male parts of the generally flat surface.

16. Assembly according to claim 15, wherein the food support comprises a flexible mat.

17. The assembly of claim 15, wherein the cutlery is one of a cup, plate, fork, or spoon.

* * * * *